Dec. 24, 1935.                G. R. FONDA ET AL                2,025,585
                    METHOD OF OPERATING VAPOR ELECTRIC LAMPS
                              Filed July 7, 1934
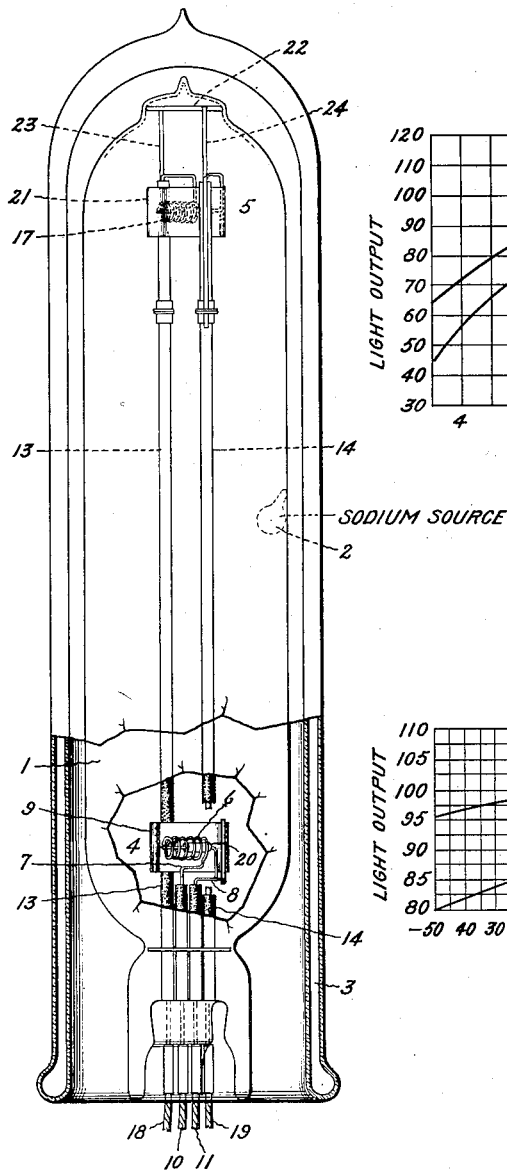
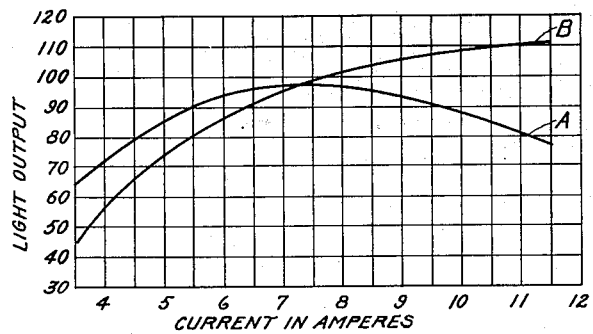
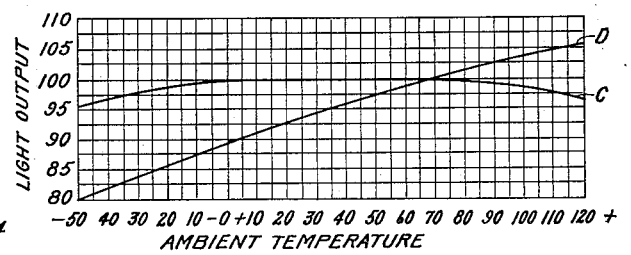
Inventors:
Gorton R. Fonda,
Andrew H. Young,
by Harry E. Dunham
Their Attorney.

Patented Dec. 24, 1935

2,025,585

UNITED STATES PATENT OFFICE 2,025,585

METHOD OF OPERATING VAPOR ELECTRIC LAMPS

Gorton R. Fonda and Andrew H. Young, Schenectady, N. Y., assignors to General Electric Company, a corporation of New York Application July 7, 1934, Serial No. 734,090

5 Claims. (Cl. 176—124)

The present invention relates to electrical discharge devices and in particular to lamps in which light is produced by the passage of electricity through an attenuated gas consisting at least in part of the vapor of a metal of relatively low volatility such, for example, as sodium.

In such lamps maximum luminous efficiency occurs at a critical pressure of the metal vapor. As the pressure of the vapor is dependent on the temperature of the lamp bulb containing the vapor and this in turn is dependent on the electrical energy expended in the lamp, it follows that the luminous efficiency is a maximum at a critical current value, or in lamp fixtures in a critical range of current values. The light output of such a lamp varies considerably with substantial differences of external or ambient temperatures, such as occurring between summer and winter or even due to cooling of the external heat conserver by a high wind, or by rain or snow.

It is the object of our invention to provide a lamp and process of operating the same whereby a substantially constant light output may be obtained under varying external conditions of temperature, wind and other conditions to which such a lamp is subjected.

A sodium lamp in an out-door installation where the lamp is subjected to out-door temperatures was operated prior to our invention with a current chosen to give the maximum operating efficiency for an intermediate range of temperatures disregarding the unavoidable decrease of the luminous output of the lamp for lower and higher ambient temperatures.

We have discovered that when lamps of this character are operated at a current value determined as hereinafter described and being somewhat greater than the range of current values corresponding to maximum luminous efficiency, substantially no change in luminous output occurs over a wide range of ambient temperatures. Even with extremes as low as minus 50° F. and as high as plus 120° F. the decrease in luminous efficiency of a lamp so operated is less than ten per cent.

The highly desirable result of uniform luminous output with variation of ambient temperature is obtained as a consequence of our invention with only a very small sacrifice of lighting efficiency.

Our invention will be more fully explained in connection with the accompanying drawing in which Fig. 1 is a side elevation (partly in section) of a lamp adapted for carrying out our invention; Fig. 2 is a graph showing the relation of luminous output for different current values when such a lamp is operated at two different ambient temperatures; and Fig. 3 is a graph showing the light output over a wide range of ambient temperatures from a vapor lamp operated in accordance with our invention.

Referring to Fig. 1, the lamp there illustrated comprises an elongated bulb 1 consisting of sodium-resistant glass, or which is lined with a sodium-resistant glaze as well understood. In it is provided an attenuated gas, ordinarily a rare gas, and a small quantity of sodium. Neon at a pressure of about one to several millimeters of mercury is satisfactory, a pressure of 1.5 mm. to 3 mm. being preferred. The sodium may be introduced in any convenient way as from a capsule 2. Such a capsule may consist of thin glass and contain a few tenths of a gram of metallic sodium. We prefer to introduce the sodium near the center of the lamp so that the sodium escaping from the capsule is deposited on that midway portion of the bulb on which it would in any event be deposited by diffusion by the operation of the lamp. By midway portion we mean about one-third of the length of the lamp envelope shown in Fig. 1. With electrodes mounted at the center of curvature at each end of the tubular container the sodium should be no nearer to the end, to the best advantage, than the distance of the bulb diameter. The initial lumen output is thereby increased from 15 to 20%. Besides giving the lamp more stable electrical characteristics throughout its life, the midway deposition of sodium has the advantage of increasing the lumen-hour output of the lamp. The glass capsule may be broken by impact as by shaking the lamp envelope, or by other known methods.

The introduction of a vaporizable material by a closed capsule adapted to be broken after the preparation of the device is complete is described and claimed in a U. S. application Serial No. 8,631, filed on February 28, 1935 by W. A. Ruggles and assigned to the same assignee as the present application.

Surrounding the elongated lamp bulb 1 is a transparent heat conservator 3, which as shown in the drawing consists of a double-walled vessel having substantially the same shape as the lamp bulb and closely surrounding it. The heat conservator preferably is evacuated.

Similar electrode structures, 4, 5, are provided at opposite ends of the envelope 1, each functioning alternately as cathode and anode during the operation of the lamp on alternating current circuits. The electrode structure 4 which has been shown partly broken away consists of a filamentary spiral 6 connected to leading-in conductors 7, 8 and surrounded by a cylindrical metal member 9 which as illustrated is electrically connected to the leading-in conductor 8. When the electrode structure 4 operates as a cathode electrons are emitted by the spiral member 6 which is heated to an electron-emitting temperature by a current supplied through the sealed-in conductors 10, 11 from any suitable source (not shown). In order to enhance the electron emissivity of the heated member 6 it is preferably coated with alkaline earth material, such, for example, as barium oxide, in accordance with well known practice. During the half wave period when the electrode structure 4 is operating as a cathode the cylindrical member 9 which surrounds the heated portion may emit some electrons, particularly so when its interior surface is also coated with emissive material such as barium oxide, but in the main it is the function of member 9 to act as anode during the reverse half cycle when the electrode 4 is of positive potential. The electrode structure 5 at the opposite end of the lamp bulb has a construction similar to the electrode structure 4. It is supported by conductors 13, 14 (the latter being shown broken so as not to hide the electrode 4). They extend substantially throughout the length of the lamp bulb and are surrounded by suitable insulating jackets consisting, for example, of alumina or beryllia. Current for heating the filamentary spiral member 17 of the electrode structure 5 is supplied through the external conductors 18, 19 from some suitable source (not shown). The electrode structure 5 is surrounded by a metal cylinder 21 which acts as anode during the half cycle when the electrode 5 is at positive potential. Within the spiral 6 may be located a supply of thermionically active material, such as barium oxide, as indicated at 20.

The electrode structures 5 and 6 are supplied with alternating current from any suitable source as well understood. The electrode structure 5 is prevented from vibrating by an anchor 22 which is attached to the insulating coating for the wires 13, 14 by the supports 23, 24. The lamp here illustrated is in some respects similar to the lamp shown in prior U. S. Patent 1,919,933 to DeGroot, patented July 25, 1933.

The lamp shown in Fig. 1 hereof is better adapted for the practice of the present invention as it has electrodes provided at each end of an elongated envelope. These electrodes increase the temperature near the ends and thereby allow of a more uniform temperature distribution throughout the lamp.

While our invention has been explained with particular reference to sodium as the vaporizable luminosity-producing agent, other equivalent materials may be used, as for example, potassium or caesium.

When a lamp such as illustrated in Fig. 1 (or a lamp as shown and described in the DeGroot patent) is operated over a range of discharge currents through the luminosity-producing gas, it will be found that the light output varies considerably. The relation between light output and operating current characteristic of the type of lamp shown in Fig. 1 is illustrated in Fig. 2 in which the abscissae are indicated as current in amperes and the ordinates as light output. Curve A shows the variation in light output when the lamp is operated at room temperature in quiet air over a range of currents from about 3½ amperes to about 11½ amperes. It will be observed that the luminous light output varies very little between 6 to 9 amperes, the maximum light output being obtained between about 7 and 7½ amperes. The maximum luminous efficiency, that is, the highest ratio of luminous output to watts consumed is not indicated in this graph. The maximum efficiency is obtained when the luminosity-producing current through the gaseous contents of the lamp is about six amperes. When the ambient temperature of such a lamp is lowered, then the luminous output is altered as shown by curve B. A lower ambient temperature may be produced by a current of air being directed upon the lamp fixtures. In a lamp in which the heat conservator was cooled to a lower temperature, the light output as indicated by curve B was materially less at currents below seven amperes. At current values of the operating range above about 7.5 amperes the light output is greater. At a point between 7 and 7.5 amperes the light output of the lamp is the same under either condition of ambient temperature. The current at the point of crossing of the curves A and B, which will be referred to hereinafter as the "temperature insensitive amperage", is the current at which a substantially constant luminous output is obtained not only for two ambient temperatures obtained as above described, but for a wide range of ambient temperatures.

When a lamp such as described is operated at this "temperature insensitive amperage", which is but slightly higher than the current corresponding to maximum luminous efficiency, then the light output is substantially constant over a wide range as indicated by the graph C in Fig. 3. In this figure the ordinates have been indicated as light output and the abscissae as ambient temperatures over a range varying from minus 50° F. to plus 120° F. The lower and higher extremes of this temperature range are rarely ever encountered under operating conditions to which highway lamps, beacon lamps, or the like, are subjected during normal operating conditions but have been included to show the unexpected results of the invention at even these extremes of temperature. As will be noted, the light output as shown by curve C is practically unchanged between a temperature of about minus 10° F. and about plus 90° F. In fact, no measurable change could be detected between a temperature of 0° F. and 70° F. When, however, the same lamp was operated at a current corresponding to peak lighting efficiency, then the light output varied materially as indicated by curve D. The difference in efficiency between operation at six amperes corresponding to peak efficiency and operation at about the "temperature insensitive amperage" of 7.3 amperes is only about two per cent.

What we claim as new and desire to secure by Letters Patent of the United States is:

1. The method of operating an electric discharge through a confined luminosity-producing gas comprising an ingredient condensible at ordinary temperatures which consists in maintaining the current through said luminosity-producing gas at the value at which the luminous output is substantially constant for materially unlike ambient temperatures.

2. The method of operating an electric discharge through a confined body of luminosity-producing gas comprising in part at least sodium vapor which consists in maintaining the current through said gas at a value which is slightly greater than the value corresponding to maximum luminous efficiency, such current value being characterized by substantially the same light emission at unlike ambient temperatures.

3. The method of operating an electric discharge between thermionic electrodes in a mixture of attenuated rare gas and sodium vapor which consists in maintaining the current through said mixture at a substantially constant value at which the luminous output is substantially unchanged by changes in ambient temperature.

4. The method of operating a luminous electric discharge through a mixture of rare gas and sodium vapor which consists in maintaining the amperage of such discharge at an ambient temperature insensitive value, whereby substantially constant light output is secured.

5. The method of operating an electric discharge lamp containing neon gas at a pressure of about 1.5 to 3.0 m. m. of mercury and a charge of metallic sodium which consists in maintaining the amperage of a discharge through said gas at a value of about 7 to 7.5 amperes at which the light output of said lamp is substantially invariable for unlike ambient temperatures.

GORTON R. FONDA.
ANDREW H. YOUNG.